(12) United States Patent
Kolb et al.

(10) Patent No.: US 10,961,418 B2
(45) Date of Patent: Mar. 30, 2021

(54) USE OF BLOCK COPOLYMERS IN ADHESIVES

(71) Applicant: Evonik Operations GmbH, Essen (DE)

(72) Inventors: Nicolai Kolb, Recklinghausen (DE); Gabriele Brenner, Dülmen (DE); Patrick Glöckner, Haltern am See (DE); Bernhard Schleimer, Marl (DE)

(73) Assignee: Evonik Operations GmbH, Essen (DE)

( * ) Notice: Subject to any disclaimer, the term of this patent is extended or adjusted under 35 U.S.C. 154(b) by 157 days.

(21) Appl. No.: 16/099,817

(22) PCT Filed: Feb. 3, 2017

(86) PCT No.: PCT/EP2017/052344
§ 371 (c)(1),
(2) Date: Nov. 8, 2018

(87) PCT Pub. No.: WO2017/194210
PCT Pub. Date: Nov. 16, 2017

(65) Prior Publication Data
US 2019/0112511 A1  Apr. 18, 2019

(30) Foreign Application Priority Data
May 9, 2016  (EP) .................................... 16168681

(51) Int. Cl.
| | | |
|---|---|---|
| *C09J 153/00* | (2006.01) | |
| *C08G 18/69* | (2006.01) | |
| *C08G 18/40* | (2006.01) | |
| *C09J 175/14* | (2006.01) | |
| *C08G 18/76* | (2006.01) | |
| *C08G 63/08* | (2006.01) | |
| *C08G 81/02* | (2006.01) | |
| *C08K 5/00* | (2006.01) | |

(52) U.S. Cl.
CPC ........ *C09J 153/00* (2013.01); *C08G 18/4063* (2013.01); *C08G 18/694* (2013.01); *C08G 18/698* (2013.01); *C08G 18/7671* (2013.01); *C08G 63/08* (2013.01); *C08G 81/027* (2013.01); *C09J 175/14* (2013.01); *C08G 2170/20* (2013.01); *C08K 5/0025* (2013.01)

(58) Field of Classification Search
CPC ...................................................... C09J 153/00
See application file for complete search history.

(56) References Cited

U.S. PATENT DOCUMENTS

| | | | |
|---|---|---|---|
| 5,652,318 A | 7/1997 | Braunstein et al. | |
| 5,756,819 A | 5/1998 | Wolf et al. | |
| 6,794,482 B2 | 9/2004 | Gloeckner et al. | |
| 6,881,785 B2 | 4/2005 | Glockner et al. | |
| 7,005,002 B2 | 2/2006 | Gloeckner et al. | |
| 7,135,522 B2 | 11/2006 | Gloeckner et al. | |
| 7,138,465 B2 | 11/2006 | Glockner et al. | |
| 7,144,975 B2 | 12/2006 | Gloeckner et al. | |
| 7,183,372 B2 | 2/2007 | Andrejewski et al. | |
| 7,687,569 B2 | 3/2010 | Glockner et al. | |
| 7,759,424 B2 | 7/2010 | Gloeckner et al. | |
| 7,812,109 B2 | 10/2010 | Gloeckner et al. | |
| 8,053,522 B2 | 11/2011 | Loehden et al. | |
| 8,084,136 B2 | 12/2011 | Loehden et al. | |
| 8,163,843 B2 | 4/2012 | Brenner et al. | |
| 8,383,728 B2 | 2/2013 | Brenner et al. | |
| 8,420,731 B2 | 4/2013 | Cavaleiro et al. | |
| 8,702,899 B2 | 4/2014 | Spyrou et al. | |
| 8,901,231 B2 | 12/2014 | Brand et al. | |
| 9,701,779 B2 | 7/2017 | Shirai et al. | |
| 9,701,780 B2 | 7/2017 | Shirai et al. | |
| 9,840,581 B2 | 12/2017 | Diehl et al. | |
| 10,202,488 B2 | 2/2019 | Cron et al. | |
| 2003/0144454 A1* | 7/2003 | Krebs ................ | C08G 18/4277 528/44 |
| 2004/0122172 A1 | 6/2004 | Glockner et al. | |
| 2005/0010016 A1 | 1/2005 | Glockner et al. | |
| 2005/0281866 A1* | 12/2005 | Jarrett ..................... | A61L 31/10 424/448 |
| 2007/0213465 A1 | 9/2007 | Brand et al. | |
| 2008/0039593 A1 | 2/2008 | Glockner et al. | |
| 2008/0069949 A1 | 3/2008 | Glockner et al. | |
| 2008/0262144 A1 | 10/2008 | Glockner et al. | |
| 2008/0306210 A1 | 12/2008 | Glockner et al. | |
| 2009/0030113 A1 | 1/2009 | Glockner et al. | |
| 2009/0048363 A1 | 2/2009 | Glockner et al. | |
| 2009/0054546 A1 | 2/2009 | Glockner et al. | |
| 2009/0227732 A1 | 9/2009 | Gloeckner et al. | |
| 2010/0105831 A1 | 4/2010 | Brenner et al. | |
| 2011/0082252 A1 | 4/2011 | Koschabek et al. | |
| 2017/0174956 A1 | 6/2017 | Ramon-Gimenez et al. | |
| 2017/0233622 A1 | 8/2017 | Brenner et al. | |
| 2018/0030320 A1 | 2/2018 | Cron et al. | |
| 2018/0037786 A1 | 2/2018 | Cron et al. | |
| 2018/0188926 A1 | 7/2018 | Haberkorn et al. | |
| 2018/0291153 A1 | 10/2018 | Cron et al. | |
| 2019/0112511 A1 | 4/2019 | Kolb et al. | |
| 2019/0153258 A1 | 5/2019 | Kolb et al. | |

FOREIGN PATENT DOCUMENTS

| | | |
|---|---|---|
| CN | 102248677 A | 11/2011 |
| CN | 102272184 A | 12/2011 |
| DE | 4416281 C1 | 11/1995 |
| JP | 2015063668 A | 4/2015 |
| TW | 201350517 | 12/2013 |

(Continued)

OTHER PUBLICATIONS

Grujicic, M; "Injection over molding of polymer-metal hybrid structures", American Journal of Science and Technology, Jan. 1, 2014; pp. 168-181.

*Primary Examiner* — Daniel H Lee
(74) *Attorney, Agent, or Firm* — Taylor English Duma LLP; Philip P. McCann

(57) ABSTRACT

The present invention relates to the use of block copolymers produced from OH-functionalized polyolefins and polyesters in adhesives or sealants and to adhesives or sealants containing said block co-polymers.

13 Claims, No Drawings

(56) References Cited

FOREIGN PATENT DOCUMENTS

| | | | |
|---|---|---|---|
| WO | 0146330 | A1 | 6/2001 |
| WO | 200196436 | A1 | 12/2001 |
| WO | 2018/108869 | A1 | 6/2018 |
| WO | 2019/043054 | A1 | 3/2019 |
| WO | 2019/086533 | A1 | 5/2019 |
| WO | 2019/086538 | A1 | 5/2019 |

\* cited by examiner

USE OF BLOCK COPOLYMERS IN ADHESIVES

CROSS REFERENCE TO RELATED APPLICATIONS

This application is a 35 U.S.C. § 371 U.S. national phase entry of International Application No. PCT/EP2017/052344 having an international filing date of Feb. 3, 2017, which claims the benefit of European Application No. 16168681.1 filed May 9, 2016, each of which is incorporated herein by reference in its entirety.

FIELD

The present invention relates to the use of block copolymers based on OH-, COOH- or amino-functionalized polymers, preferably polyolefins, and polyesters in adhesives or sealants, and to adhesives or sealants comprising the block copolymers mentioned.

BACKGROUND

Polyester polyols and polyether polyols nowadays have many uses as raw materials, one being for production of adhesives and sealants. These adhesives and sealants may, for example, be thermoplastic or reactive hotmelt adhesives, 1K (one-pack) or 2K (two-pack) liquid adhesives, or epoxy systems. For reactive adhesive systems, the polyols are reacted, for example, generally with diisocyanates to give reactive, moisture-curing polymers. The substrates are typically applied as a melt and have an initial strength. The reactive end groups result in a reaction with air humidity, such that the polymer cures further and subsequently can be melted again only with great difficulty, if at all.

SUMMARY

Such moisture-curing hotmelt adhesives feature rapid curing, and also high formulation flexibility and a broad spectrum of application. For example, very good bonding of wood, textiles or metals is possible. However, a disadvantage is that very nonpolar materials, for example low-energy plastics such as polyethylene or polypropylene, generally cannot be bonded to reactive hotmelt adhesives based on polyesters or polyethers because of poor wetting, without pretreatment of the surface. For such bonds, it is customary to utilize thermoplastic or silane-modified polyolefins. The problem here is that polyolefins are incompatible or immiscible with the polyester- and polyether-based systems. It is likewise the case that it typically takes longer for such polyolefin-based adhesives to cure. Adhesives based on polyesters or/and polyethers and polyolefins for combination of the advantages of the two systems are thus not realizable at present, since the incorporation of the polyolefins via reactive end groups is not possible for lack of compatibility. Such systems would separate owing to incompatibility.

DETAILED DESCRIPTION

The problem addressed was thus that of providing systems which enable compatibility of polyester and/or polyether systems with polyolefins and hence combine the positive properties of the two systems.

Said problem is solved through the use of block copolymers according to the present invention. The present invention accordingly firstly provides for the use of block copolymers formed from OH-, COOH- or amino-terminated polymers and polyesters in adhesives or sealants, especially as a component for improving the adhesion of adhesive or sealant formulations, wherein the OH-, COOH- or amino-functionalized polymers are selected from $NH_2$- or NHR- or $NR_2$-functionalized polyamides, $NH_2$- or NHR- or $NR_2$-functionalized polyamines, OH- or COOH-functionalized polystyrene or OH- or COOH-functionalized polyolefins, with R=identical or different organic radicals, preferably aliphatic or aromatic radicals, preferably having 1 to 20, more preferably 1 to 6 carbon atoms.

It has been found that, surprisingly, the disadvantages of the prior art, namely the low adhesion of polyester- and/or polyether-based adhesive systems, especially PU adhesives, to low-energy surfaces can be overcome by the incorporation of the block copolymers used in accordance with the invention. For example, it is possible in this way to improve the joining of polar to nonpolar materials. In addition, the inventive use of block copolymers formed from OH-, COOH- or amino-terminated polymers and polyesters offers the advantage that the nonpolar units, for example hydroxyl-terminated polybutadienes, are rendered compatible by the block structure and are modifiable in any of a variety of ways by means of the polyester, for example in terms of molecular weight, thermal properties and miscibility with other polyesters. The effect of block copolymers formed from OH-, COOH- or amino-terminated polymers and polyesters for improvement of the adhesion properties on substrates that are difficult to bond is unknown to the person skilled in the art from the prior art, especially in the respect that the mere addition of the block copolymers is sufficient for their effect to be displayed. Furthermore, the insertion of polybutadiene structures into the polyester system can achieve elevated flexibility and elasticity of the adhesive or sealant at low temperatures, the absorption of contaminants on surfaces, such as oil residues or separating agents, and a barrier function for oxygen by virtue of the double bonds of the polybutadiene.

In general, the block copolymers used in accordance with the invention that are based on OH-, COOH- or amino-functionalized, preferably terminated, polymers and polyesters are $B(A)_x$ block systems with A=polyester, with B=OH-, COOH- or amino-functionalized, preferably terminated, polymer, preferably a polyolefin, and with x≥1, preferably>1. The value of x reflects the functionality of the OH-, COOH- or amino-functionalized, preferably terminated, polymer. In general, the functionality of the OH-, COOH- or amino-functionalized, preferably terminated, polymers and hence x is in the range from 1 to 5, preferably in the range from 1.5 to 3.5, especially preferably in the range from 2 to 3. In the case that x=2, i.e. in the case of OH-, COOH- or amino-functionalized, preferably terminated, polymers having a functionality of 2, the block copolymers are especially ABA triblock systems. In addition, block structures of the formula $(AB)_n$ are likewise possible, where n>1. All that US 2003/0144454 suggests is the distinctly different BAB triblock structures. Block copolymers used with preference in accordance with the invention are those which are OH- or COOH-terminated.

In more detail, the block copolymers used in accordance with the invention that are based on OH-, COOH- or amino-functionalized, preferably terminated, polymers and polyesters can be described as $B'-(-Y-A'-X)_x$ systems with A'=polyester radical, B'=polyolefin radical, Y=O, COO or NR groups with R as defined above, X=OH or COOH terminal groups and x≥1, preferably x≥1.

In principle, it is possible to use any OH-, COOH- or amino-functionalized known to the person skilled in the art from the group comprising $NH_2$- or NHR- or $NR_2$-functionalized polyamides, $NH_2$- or NHR- or $NR_2$-functionalized polyamines, OH- or COOH-functionalized polystyrene or OH- or COOH-functionalized polyolefins, preferably terminated, polymers as basis for the block copolymers in the context of the present invention. In the context of the present invention, preference is given to the presence of terminal OH or amino groups for formation of the copolymers. Furthermore, in the preferred OH- or amino-terminated polymers, further OH, COOH or amino groups may be present along the chain.

Examples of suitable OH-, COOH- or amino-functionalized polymers are $NH_2$- or NHR- or $NR_2$-functionalized polyamides, $NH_2$- or NHR- or $NR_2$-functionalized polyamines, OH- or COOH-functionalized polystyrene, OH- or COOH-functionalized polyolefins such as OH- or COOH-functionalized polybutadiene, OH- or COOH-functionalized polyisoprene, OH- or COOH-functionalized polyethylene, OH- or COOH-functionalized polypropylene. Preferred OH- or COOH-functionalized polymers are OH- or COOH-terminated polymers, especially OH- or COOH-terminated polystyrene and OH- or COOH-terminated polyolefins, especially OH- or COOH-terminated polybutadiene. Even more preferably, the OH-, COOH- or amino-terminated polymer is OH- or COOH-terminated polybutadiene. Most preferably, the OH-, COOH- or amino-terminated polymer is OH-terminated polybutadiene.

In the context of the present invention, as stated at the outset, the OH-, COOH- or amino-terminated polymers used for the preparation of the block copolymers used in accordance with the invention are especially preferably OH-terminated polybutadienes. These may be used in unhydrogenated form or else in partly or fully hydrogenated form.

In a particularly preferred embodiment of the present invention, the hydroxyl-terminated polybutadiene comprises the 1,3-butadiene-derived monomer units

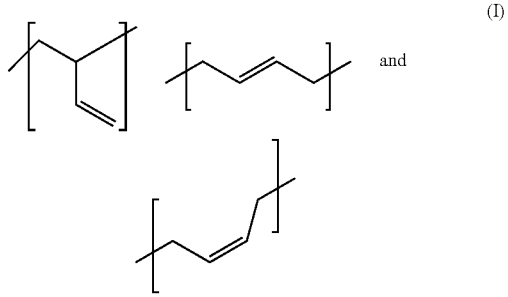

(I)

and wherein the proportion of (I) in the entirety of the 1,3-butadiene-derived monomer units present in the polybutadiene is 10 to 60 mole percent, and wherein the sum total of the proportions of (II) and (III) in the entirety of the 1,3-butadiene-derived monomer units present in the polybutadiene is 40 to 90 mole percent.

The abovementioned hydroxyl-terminated polybutadiene is a polybutadiene having hydroxyl groups produced by free-radical polymerization of 1,3-butadiene, in each case comprising the 1,3-butadiene-derived monomer units (I), (II) and (III) present in the polybutadiene, where a square bracket in the formula representation chosen in this application for the 1,3-butadiene-derived monomer units (I), (II) and (III) present in the polybutadiene shows that the bond marked with the respective square bracket does not end with a methyl group, for instance; instead, the relevant monomer unit is bonded via this bond to another monomer unit or a hydroxyl group. These monomer units (I), (II) and (III) may be arranged in the polymer in any desired sequence. A random arrangement is preferred.

In a preferred embodiment, the proportion of (I), (II) and (III) in the entirety of the 1,3-butadiene-derived monomer units present in the polybutadiene is in each case independently at least 10 mol %.

Especially preferably, the proportion of (I) in the entirety of the 1,3-butadiene-derived monomer units present in the polybutadiene is 15 to 30 mol %, the proportion of (II) in the entirety of the 1,3-butadiene-derived monomer units present in the polybutadiene is 50 to 70 mol % and the proportion of (III) in the entirety of the 1,3-butadiene-derived monomer units present in the polybutadiene is 15 to 30 mol %. The mean molecular weight, determined by gel permeation chromatography, of the hydroxyl-terminated polybutadienes is typically between 500 and 10 000 g/mol, preferably between 1000 and 5000 g/mol, more preferably between 1500 and 4000 g/mol.

In a preferred embodiment, in addition to the 1,3-butadiene-derived monomer units (I), (II) and (III) present in the polybutadiene, other monomer units may also be present, especially those that are not derived from 1,3-butadiene. In a preferred embodiment, however, the entirety of the 1,3-butadiene-derived monomer units (I), (II) and (III) present in the polybutadiene represents a proportion of the entirety of the monomer units incorporated in the polymer and comprising the 1,3-butadiene-derived units and other units of at least 80, preferably 90, more preferably 95 and most preferably 100 mole percent.

The hydroxyl-terminated polybutadienes used in accordance with the invention are prepared by means of free-radical polymerization, for example by polymerization of 1,3-butadiene in the presence of hydrogen peroxide, water and an organic solvent. Suitable processes are described, for example, in EP 2 492 292.

The polybutadienes usable with preference in the context of the present invention are commercially available, for example in the form of POLYVEST® HT from Evonik Resource Efficiency GmbH.

The functionality of the OH-terminated polybutadienes used is generally in the range from 1 to 5, preferably in the range from 1.5 to 3.5 and especially preferably in the range from 2 to 3.

An essential factor in the present invention is the presence of OH groups for formation of the copolymers. These OH groups are typically present at the chain end of the polybutadiene; in addition, further OH groups may be present along the chain in the OH-terminated polybutadienes.

In the context of the present invention, the functionality is determined by the correlation of molecular weight with OHN.

It is possible to adjust the functionality, for example by the reaction of monoisocyanates with the OH groups.

As well as the above-described OH-, COOH- or amino-terminated polymers, the block copolymers used in accordance with the invention contain blocks formed from polyesters; more particularly, the block copolymers are based on polyesters formed from lactones and/or lactide.

Examples of suitable lactones are especially $C_3$ lactones such as β-propiolactone, $C_4$ lactones such as β-butyrolactone or γ-butyrolactone, $C_5$ lactones such as 4-hydroxy-3-pentenoic acid-gamma-lactone, α-methylene-γ-butyrolactone, γ-methylene-γ-butyrolactone, 3-methyl-2(5H)- furanone, γ-valerolactone, δ-valerolactone, C$_6$ lactones such as δ-hexalactone, ε-caprolactone or γ-hexalactone, or further lactones such as 5-butyl-4-methyldihydro-2(3H)-furanone, δ-octanolactone, γ-phenyl-ε-caprolactone, oxacyclododecan-2-one, oxacyclotridecan-2-one, pentadecanolide, 16-hexadecanolide, γ-undecalactone, δ-undecalactone, γ-methylene-γ-butyrolactone and mixtures thereof.

Lactides in the context of the present invention are understood to mean cyclic esters of lactic acid which can occur in three isomers: (S,S)-3,6-dimethyl-1,4-dioxane-2,5-dione (CAS No. 4511-42-6), (R,R)-3,6-dimethyl-1,4-dioxane-2,5-dione (CAS No. 25038-75-9) and (meso)-3,6-dimethyl-1,4-dioxane-2,5-dione (CAS No. 13076-19-2). No isomeric form is particularly preferred here.

Preferably, preparation of the block copolymers is accomplished using mixtures of at least two lactones and/or lactides, preferably mixtures of one lactone and one lactide, with especial preference for mixtures of epsilon-caprolactone and lactide. In this way, it is possible to vary the properties of the block copolymers in a controlled manner, especially with regard to miscibility with other polyester polyols or with regard to the thermal properties.

The block copolymers used in accordance with the invention, formed from OH-, COOH- or amino-functionalized polymers and polyesters, are especially obtained by OH-, COOH- or amino-initiated ring-opening polymerization. The OH-, COOH- or amino-functionalized polymers serve here as initiator in the ring opening of the lactones and/or lactides, which leads to the formation of the polyester chains on the OH-, COOH- or amino-functionalized polymer.

Standard homogeneous catalysts for the ring-opening polymerization are, for example, tin(II) ethylhexanoate, dibutyltin dilaurate, organic amidine bases such as 1,8-diazabicyclo[5.4.0]undec-7-ene, 1,5-diazabicyclo[4.3.0]non-5-ene, 1,4-diazabicyclo[2.2.2]octane and 1,5,7-triazabicyclo[4.4.0]dec-5-ene, or titanium(IV) alkoxides such as tetramethyl titanate, tetrabutyl titanate, tetraisopropyl titanate, tetraphenyl titanate, dibutyltriethanolamine titanate, tetrahexyl titanate or triethanolaminatoisopropyl titanate.

The ring-opening reaction is normally conducted at temperatures of 20-250° C., especially within a period of 0.1-20 hours, either in the melt or in the presence of solvents.

The molar ratios of lactone and/or lactide to OH-, COOH- or amino-containing polymers are typically 1:1 to 200:1.

The concentration of hydroxyl end groups in the block copolymers used in accordance with the invention, determined by titrimetric means to DIN 53240-2, is between 0 and 300 mg KOH/g, preferably between 5 and 50 mg KOH/g.

The concentration of acid end groups in the block copolymers used in accordance with the invention, determined to DIN EN ISO 2114, is between 0 and 50 mg KOH/g, but preferably below 2 mg KOH/g.

The number-average molecular weight of the block copolymers used in accordance with the invention is 600-60 000 g/mol, preferably 1000-30 000 g/mol. It is determined to DIN 55672-1 by means of gel permeation chromatography in tetrahydrofuran as eluent and polystyrene for calibration.

The functionality of the block copolymers used in accordance with the invention is generally in the range from 1 to 5, preferably in the range from 1.5 to 3.5. In the context of the present invention, the functionality is determined by the correlation of molecular weight with OHN.

The present invention further provides adhesive or sealant formulations comprising block copolymers formed from OH-, COOH- or amino-functionalized polymers (block B) and polyesters (block A).

The present invention further provides preferred adhesive or sealant formulations at least comprising (a) block copolymers formed from OH-, COOH- or amino-functionalized polymers (block B) and polyesters (block A), and (b) at least one further OH-, COOH- or amino-functionalized component, especially OH-functionalized polyesters, OH-functionalized polyethers, OH-functionalized polybutadiene (e.g. POLYVEST® HT), OH- and/or COOH-functionalized poly(meth)acrylates or amino-functionalized polymers.

The adhesive or sealant formulations according to the invention are preferably one-pack or two-pack, moisture-crosslinking, radiation-crosslinking or thermally crosslinking polyurethane adhesives.

In a further embodiment, the adhesive or sealant formulations according to the invention are one-pack reactive systems curable by vulcanization.

As well as the block copolymers formed from OH-, COOH- or amino-functionalized polymers and polyesters (a), the adhesive formulations according to the invention preferably contain at least one further OH-, COOH- or amino-functionalized component (b), preferably based on polyesters, polyethers, poly(meth)acrylates or polybutadienes.

The functionalized polymers (b) used can in principle be selected freely and are known in principle to the person skilled in the art from the prior art.

Suitable polyethers may, for example, be prepared by the anionic or base-catalysed ring-opening polymerization of epoxides, for example ethylene oxide, propylene oxide, styrene oxide or mixtures thereof.

Preference is given to using a polyester or OH-functionalized polybutadiene as component (b), particularly preferably a polyester. In a preferred embodiment of the present invention, the at least one polyester (b) is selected from polyesters which are preferably synthesized by melt condensation of di- or polyols and di- or polycarboxylic acids or derivatives thereof, or which have been prepared by ring-opening polymerization.

With regard to the di- or polyols and di- or polycarboxylic acids, there are no restrictions in principle, and it is possible in principle for any mixing ratios to occur. The selection is guided by the desired physical properties of the polyester. At room temperature, these may be solid and amorphous, liquid and amorphous or/and (semi)crystalline.

Di- or polycarboxylic acids used may be any organic acids which are known to those skilled in the art and contain two or more carboxyl functionalities. In the context of the present invention, carboxyl functionalities are also understood to mean derivatives thereof, for example esters or anhydrides.

The di- or polycarboxylic acids may especially be aromatic or saturated or unsaturated aliphatic or saturated or unsaturated cycloaliphatic di- or polycarboxylic acids. Preference is given to using bifunctional dicarboxylic acids.

Examples of suitable aromatic di- or polycarboxylic acids and derivatives thereof are compounds such as dimethyl terephthalate, terephthalic acid, isophthalic acid, naphthalenedicarboxylic acid and phthalic anhydride.

Examples of linear aliphatic dicarboxylic or polycarboxylic acids include oxalic acid, dimethyl oxalate, malonic acid, dimethyl malonate, succinic acid, dimethyl succinate, glutaric acid, dimethyl glutarate, 3,3-dimethylglutaric acid, adipic acid, dimethyl adipate, pimelic acid, suberic acid, azelaic acid, dimethyl azelate, sebacic acid, dimethyl sebacate, undecanedicarboxylic acid, decane-1,10-dicarboxylic acid, dodecane-1,12-dicarboxylic acid, brassylic acid, tetradecane-1,14-dicarboxylic acid, hexadecane-1,16-dioic acid, octadecane-1,18-dioic acid, dimer fatty acids and mixtures thereof.

Examples of unsaturated linear di- and/or polycarboxylic acids include itaconic acid, fumaric acid, maleic acid or maleic anhydride.

Examples of saturated cycloaliphatic di- and/or polycarboxylic acids include derivatives of cyclohexane-1,4-dicarboxylic acids, cyclohexane-1,3-dicarboxylic acids and cyclohexane-1,2-dicarboxylic acids.

It is possible in principle to use any desired diols or polyols for the preparation of the polyesters.

Polyols are understood to mean compounds bearing preferably more than two hydroxyl groups. For instance, linear or branched aliphatic and/or cycloaliphatic and/or aromatic diols or polyols may be present.

Examples of suitable diols or polyols are ethylene glycol, propane-1,2-diol, propane-1,3-diol, butane-1,4-diol, butane-1,3-diol, butane-1,2-diol, butane-2,3-diol, pentane-1,5-diol, hexane-1,6-diol, octane-1,8-diol, nonane-1,9-diol, dodecane-1,12-diol, neopentyl glycol, butylethylpropane-1,3-diol, methylpropane-1,3-diol, methylpentanediols, cyclohexanedimethanols, tricyclo[2.2.1]decanedimethanol, isomers of limonenedimethanol, isosorbitol, trimethylolpropane, glycerol, 1,2,6-hexanetriol, pentaerythritol, polyethylene glycol, polypropylene glycol and mixtures thereof. Aromatic diols or polyols are understood to mean reaction products of aromatic polyhydroxy compounds, for example hydroquinone, bisphenol A, bisphenol F, dihydroxynaphthalene etc., with epoxides, for example ethylene oxide or propylene oxide. Diols or polyols present may also be ether diols, i.e. oligomers or polymers based, for example, on ethylene glycol, propylene glycol or butane-1,4-diol.

Preference is given to using bifunctional diols and dicarboxylic acids.

Polyols or polycarboxylic acids having more than two functional groups may be used as well, such as trimellitic anhydride, trimethylolpropane, pentaerythritol or glycerol, for example. Moreover, lactones and hydroxycarboxylic acids may be used as constituents of the polyester.

The concentration of hydroxyl end groups, determined by titrimetric means to DIN 53240-2, is between 0 and 300 mg KOH/g, preferably between 5 and 150 mg KOH/g, more preferably
between 10 and 200 mg KOH/g.

The concentration of acid end groups, determined to DIN EN ISO 2114, is between 0 and 300 mg KOH/g, but preferably below 2 mg KOH/g.

The number-average molecular weight of the polyesters used in accordance with the invention is 500-30 000 g/mol, preferably 1000-20 000 g/mol. It is determined to DIN 55672-1 by means of gel permeation chromatography in tetrahydrofuran as eluent and polystyrene for calibration.

In a preferred embodiment of the present invention, the adhesive or sealant formulations are adhesive formulations, especially thermoplastic hotmelt adhesives which cure by purely physical means. In a further, particularly preferred embodiment of the present invention, the adhesive formulations are one-pack or two-pack, moisture-crosslinking, radiation-crosslinking or thermally crosslinking polyurethane adhesives, with especial preference for reactive hotmelt adhesives (reactive hotmelts, RHM) which additionally crosslink chemically, preferably moisture-curing hotmelt adhesives.

In a further preferred embodiment of the present invention, the adhesive and sealant formulations are one-pack reactive systems curable by vulcanization.

The proportion of the block copolymers used in accordance with the invention, formed from OH-, COOH- or amino-functionalized polymers (block B) and polyesters (block A) in the formulation is, based on the overall formulation, 1-99 percent by weight, preferably 5-85 percent by weight, especially preferably 5-75 percent by weight and particularly preferably 10-70 percent by weight.

In preferred embodiments, further polyols are present in the hotmelt adhesives in addition to the block copolymers used in accordance with the invention, formed from OH-, COOH- or amino-functionalized polymers (block B) and polyesters (block A) (a), and at least one further OH-, COOH- or amino-functionalized component (b), preferably based on polyesters, polyethers, poly(meth)acrylates or polybutadienes, and these further polyols shall be understood to mean, for example, polyester polyols, polyether polyols and any desired hydroxyl-functional components. These polyols may be chosen as desired in principle.

Examples of freely selectable hydroxyl-functional components are functionalized (H-acidic) thermoplastic polyurethanes (TPUs) or ethylene-vinyl acetate copolymers (EVA).

The reactive 1K adhesive and sealant formulations according to the invention are obtained by the reaction of the polyol mixture with polyisocyanates. In the 1K adhesives and sealants, the OH:NCO ratio of polyester to isocyanate is generally 1:1.2 to 1:5.0, preferably 1:1.5 to 1:3.5. In the 2K adhesives and sealants, the OH:NCO ratio of polyol components to isocyanate is generally 1:0.8 to 1:5.0, preferably 1:1.0 to 1:1.5 and more preferably 1:1.1.

The polyisocyanates may be di- and/or multifunctional, aromatic, aliphatic and/or cycloaliphatic isocyanates, and carbodiimide-modified isocyanates or isocyanate-terminated prepolymers. Aromatic polyisocyanates are particularly preferred. Examples of polyisocyanates are diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate and mixtures thereof. They are especially diphenylmethane 4,4'-diisocyanate and mixtures of diphenylmethane 4,4'-diisocyanate and diphenylmethane 2,4'-diisocyanate.

Instead of polyisocyanates, the block copolymers according to the invention can be effected by a stepwise reaction with polyisocyanates to give isocyanate-terminated prepolymers and subsequent reaction with organosilanes, or by reaction with an adduct formed from polyisocyanates and organosilanes. In the simplest case, the polyesters are reacted with an isocyanatoalkylsilane in an OH/NCO ratio of 1:1 to 1:1.5. Examples of organosilanes are aminopropyltrimethoxysilane, aminopropyltriethoxysilane, N-methylaminopropyltrimethoxysilane, N-cyclohexylaminopropyltrimethoxysilane, N-phenylaminopropyltrimethoxysilane, mercaptopropyltrimethoxysilane, mercaptotriethoxysilane.

It is likewise possible to utilize the block copolymers according to the invention for radiation-curing systems. For this purpose, the block copolymers according to the invention can be effected by a stepwise reaction with polyisocyanates to give isocyanate-terminated prepolymers and subsequent reaction with, for example, a (meth)acrylate containing OH groups, or by reaction with an adduct formed from polyisocyanates and a (meth)acrylate containing OH groups. In the simplest case, the polyesters are reacted with an isocyanatoacrylate in an OH/NCO ratio of 1:1 to 1:1.5. Examples of (meth)acrylates containing OH groups are 2-hydroxyethyl (meth)acrylate, hydroxypropyl (meth)acrylate, 3-(acryloyloxy)-2-hydroxypropyl (meth)acrylate or 4-hydroxybutyl (meth)acrylate.

Apart from the block copolymers used in accordance with the invention, formed from OH- or amino-terminated polymers (a), and at least one further OH-, COOH- or amino-functionalized component (b), the adhesive formulation may contain up to 50% by weight, based on the overall formulation, of further additives.

These additions may be: nonfunctionalized polymers, for example thermoplastic polyurethanes (TPUs) and/or polyacrylates and/or ethylene-vinyl acetate copolymers (EVA); pigments or fillers, for example talc, silicon dioxide, titanium dioxide, barium sulphate, calcium carbonate, carbon black or colour pigments, tackifiers, for example rosins, hydrocarbon resins, phenol resins, and ageing stabilizers and auxiliaries.

The vulcanization-curing reactive systems according to the invention are obtained by the reaction of the block copolymers used in accordance with the invention with at least one vulcanizing agent.

Suitable vulcanizing agents may, for example, be sulphur, peroxidic vulcanizing agents, quinones, quinone dioximes and/or dinitrosobenzenes.

In a preferred embodiment of the present invention, the adhesive or sealant formulations contain a mixture of block copolymers based on hydroxyl-functional polybutadiene (block B) and polyesters (block A) as component (a), especially 5%-75% by weight, based on the sum total of components (a) and (b), and at least one polyester as component (b), especially 25%-95% by weight, based on the sum total of components (a) and (b), and at least one polyisocyanate, where the NCOs:OH ratio of polyol to isocyanate is 2.0-3.5. The formulation may optionally contain up to 50% by weight of fillers.

In a further preferred embodiment of the present invention, the adhesive or sealant formulations contain a mixture of block copolymers based on hydroxyl-functional polybutadiene (block B) and polyesters (block A) as component (a), especially 5%-75% by weight, based on the sum total of components (a) and (b), and at least one hydroxyl-functional polybutadiene as component (b), especially 25%-95% by weight, based on the sum total of components (a) and (b), and at least one polyisocyanate, where the NCO:OH ratio of polybutadiene to isocyanate is 2.0-3.5. The formulation may optionally contain up to 50% by weight of fillers.

In a further preferred embodiment of the present invention, the adhesive or sealant formulations contain block copolymers based on hydroxyl-functional polybutadiene (block B) and polyesters (block A) as component (a), and optionally a further component (b) containing double bonds, and at least one vulcanizing agent. The formulation may optionally contain up to 70% by weight of fillers or/and other additives.

The above-described adhesive systems, depending on the viscosity of the respective formulation, can be applied at temperatures between room temperature and 200° C., preferably between 80 and 150° C.

The present invention further provides for the use of adhesive or sealant formulations according to the present invention for bonding or sealing of substrates, especially for bonding or sealing of nonpolar substrates.

The hotmelt adhesives of the invention are particularly suitable for production of adhesive bonds of a variety of substrates, for example plastics, metals, types of wood, mineral substrates, for example asphalt, concrete, especially for bonding of metallic substrates and textiles, and very particularly for bonding of various plastics. The nature and extent of the bonding are unlimited.

Preferably, the adhesive and sealant formulations consisting of block copolymers based on hydroxyl-functional polybutadiene (block B) and polyesters (block A) as component (a), and optionally a further component (b) containing double bonds, and at least one vulcanizing agent, are used for bonding or sealing of metallic substrates, more preferably steel or aluminium.

Surprisingly, the formulations according to the invention are suitable for use on nonpolar surfaces.

In a preferred embodiment, the substrates bonded in accordance with the invention are substrates having a surface tension below 40 mN/m, preferably below 35 mN/m, determined to DIN 55660-2, for example polyethylene or polypropylene.

In a further preferred embodiment, the substrates bonded in accordance with the invention are oily substrates. Oily substrates are understood to mean those substrates which contain natural, synthetic or mineral oils on the surface. The oily substances may get onto or into the substrates as a result of processing steps (for example drawing greases, waxes, separating agents etc.), or they may get onto the surface from the substrate (for example oily types of wood, for example meranti wood).

Preferably, the bonds are bonds in the wood and furniture industry (for example assembly bonding and the lamination of decorative films onto fibreboard), in the automotive sector (for example laminations of films or textiles onto door side parts, inner roof linings, seat manufacture and retainer bonds, installable components in the (semi-)structural sector, fibre-reinforced composite materials or/and metals), in the construction industry, shoe industry and textile industry (for example siliconized or hydrophobized textiles), and in window construction (for example for profile ensheathing). In addition, the adhesives of the invention are suitable in the packaging industry, as sealants and as coating material.

The hotmelt adhesives of the invention are suitable for use either in one-pack or in two-pack systems.

In the case of the one-pack adhesives, the mixture is produced at a different time from the adhesive application, typically at a much earlier time. The application of the adhesive of the invention is followed by curing, for example by moisture or by thermally induced reaction of the co-reactants present in the adhesive.

In the case of the two-part adhesives, the mixture is produced directly prior to adhesive application.

The adhesive formulations according to the invention can be applied by all known methods, for example extruder, bead, nozzle, spreading, dipping, injecting, pouring, rolling, spraying, printing, wiping, washing, tumbling, centrifuging, powder (electrostatic).

Even without further observations, it is assumed that a skilled person will be able to utilize the above description to its widest extent. The preferred embodiments and examples are therefore to be interpreted merely as a descriptive disclosure which is by no means limiting in any way whatsoever. The present invention is elucidated in more detail below using examples. Alternative embodiments of the present invention are obtainable analogously.

EXAMPLES

Measurement Methods:
1. Gel Permeation Chromatography

The number-average molecular weight of the block copolymers or polyesters used in the context of the present invention is determined to DIN 55672-1 by means of gel permeation chromatography in tetrahydrofuran as eluent and polystyrene for calibration.

2. Differential Scanning Calorimetry

The thermal properties of the block copolymers or polyesters used in the context of the present invention are determined by differential scanning calorimetry (DSC) by the DSC method DIN 53765.

3. OHN

The block copolymers prepared have hydroxyl groups as end groups. The concentration of the OH groups is determined in accordance with DIN 53240-2 by titrimetric means in mg KOH/g of polymer.

4. Tensile Shear Strength

The bonding properties of the adhesive formulations produced are measured on the basis of the tensile shear strength in accordance with DIN EN 1465 in $N/mm^2$.

Raw Materials Used:

POLYVEST® HT: hydroxyl-terminated polybutadiene from Evonik Resource Efficiency GmbH)

POLYVEST 110: unfunctionalized polybutadiene from Evonik Resource Efficiency GmbH)

DYNACOLL® 7360: polyester with OHN 30 (from Evonik Resource Efficiency GmbH)

DYNACOLL® 7255: polyester with OHN 30 (from Evonik Resource Efficiency GmbH)

DYNACOLL® 7255-6: modified DYNACOLL® 7255 with OHN 66 (from Evonik Resource Efficiency GmbH)

Lupranat® ME: diphenylmethane 4,4'-diisocyanate (MDI-from BASF SE)

Preparation of the Inventive Block Copolymers

Synthesis of Block Copolymer P1

225 g of POLYVEST® HT (hydroxyl-terminated polybutadiene from Evonik Resource Efficiency GmbH) were blended with 525 g of ε-caprolactone and 0.75 g of a titanium catalyst under a nitrogen stream in a 1 l multineck flask with a reflux condenser.

Subsequently, the mixture was heated under a constant nitrogen stream to 160° C. for 6 hours. The GPC analysis of the block copolymer gives a mean molecular weight $M_n$ of 9000 g/mol with a PDI of 2.6; the DSC analysis gives a melting point of 55° C. The OHN of the polymer is 17 mg KOH/g of polymer.

Synthesis of Block Copolymer P2

225 g of POLYVEST® HT were blended with 262.5 g of ε-caprolactone, 262.5 g of lactide and 0.75 g of a titanium catalyst under a nitrogen stream in a 1 l multineck flask with a reflux condenser. Subsequently, the mixture was heated under a constant nitrogen stream to 160° C. for 6 hours. The GPC analysis of the block copolymer gives a mean molecular weight $M_n$ of 6300 g/mol with a PDI of 3.3; the DSC analysis gives glass transition temperatures of −82° C. and −30° C. The OHN of the polymer is 19 mg KOH/g of polymer.

Production and Analysis of Reactive 1K Polyurethane Adhesives:

Production of RHM 1

In a 500 ml flange flask, 50 parts by weight of DYNACOLL® 7360, 20 parts by weight of DYNACOLL® 7255 and 30 parts by weight of DYNACOLL® 7255-56 were melted and dried at 130° C. under reduced pressure. Thereafter, diphenylmethane 4,4'-diisocyanate (Lupranat® ME) was added in a molar OH/NCO ratio of 1:2.0 and the mixture was homogenized rapidly. For complete conversion of the co-reactants, the mixture was stirred under a protective gas atmosphere at 130° C. for 45 minutes. Subsequently, the moisture-curing hotmelt adhesive (RHM) was dispensed.

Production of RHM 2-9

The production of Examples RHM 2-9 is effected analogously to Example RHM 1 according to the compositions and temperatures specified in Table 1 and Table 2.

TABLE 1

Composition of reactive hotmelt adhesives (RHM) examined

Composition in % by weight based on the polyols

| Constituents | RHM 1 (comparative example) | RHM 2 (comparative example) | RHM 3 (inventive) | RHM 4 (inventive) |
|---|---|---|---|---|
| P1 | | | 70 | |
| P2 | | | | 70 |
| DYNACOLL® 7360 | 50 | 50 | | 30 |
| DYNACOLL® 7255 | 20 | 20 | 30 | |
| DYNACOLL® 7255-66 | 30 | | | |
| POLYVEST® HT | | 30 | | |
| Lupranat® ME (OH:NCO) | 1:2.0 | 1:3.0 | 1:3.0 | 1:3.0 |
| Reaction temperature [° C.] | 130 | 80 | 130 | 130 |
| Storage stability | storage-stable | not storage-stable (separation) | storage-stable | storage-stable |

Elucidation of storage stability: The RHM is rated as storage-stable when no macroscopic phase separation occurs after storage at 130° C. for 24 h.

Tensile Shear Strength Test Data

| Substrate | RHM 1 | RHM 2 | RHM 3 | RHM 4 |
|---|---|---|---|---|
| Degreased steel | 3.8 PC | 2.9 C | 3.7 A | 1.5 PC |
| Oiled steel | 0.6 A | 1.6 PC | 2.2 A | 1.0 PC |
| PP | 0.3 A | 0.6 A | 0.5 A | 0.8 A |
| PVC | 9.5 M | 11.5 M | 9.9 M | 11 M |

Bonding values (tensile shear strength in $N/mm^2$-type of bond fracture)

The steel was cleaned with acetone and then, with the aid of a paper towel, as an example substance, the N62 lubricant oil for vacuum pumps (from Leybold) was applied. It was found that an amount of oil of 0.0384 g was applied over an area of 15.3×10.0 cm, giving about 2.5 $g/m^2$. Before the application of oil, the steel was heated to 65° C.

The tensile shear strength values are reported after storage of the bonded substrates for 1 week in a climate-controlled cabinet (20° C., 65% relative air humidity).

Elucidations for Type of Fracture:

| Symbol | Fracture |
|---|---|
| A | Adhesive fracture-the adhesive is removed without residue from at least 1 substrate in the tensile shear strength experiment. |
| M | Material fracture-the bond is conserved in the tensile shear strength experiment; the bonded material fractures. |
| C & PC | Cohesive fracture, partial cohesive fracture—in the tensile shear strength experiment, adhesive remains on the substrate, the adhesive fractures internally. |

It is clearly apparent that the adhesion properties of RHM 3 & 4 comprising the inventive block copolymers are significantly improved on oily steel. The inventive RHMs 3 and 4 likewise show a distinct improvement in adhesion on nonpolar polypropylene. At the same time, RHMs 3 and 4 show constantly good properties on polar PVC.

Analysis of RHM formulations consisting of inventive block copolymers and polyester polyol on oily steel (Table 2):

TABLE 2

Composition of reactive hotmelts (RHM) examined

Composition in % by weight based on the polyols

| Constituents | RHM 5 (comparative example) | RHM 6 (inventive) | RHM 7 (inventive) | RHM 8 (inventive) | RHM 9 (inventive) |
|---|---|---|---|---|---|
| P1 | | 25 | 50 | 75 | 100 |
| DYNACOLL ® 7360 | 100 | 75 | 50 | 25 | |
| Lupranat ® ME (OH:NCO) | 1:2.2 | 1:2.4 | 1:2.6 | 1:2.8 | 1:3.0 |
| Reaction temperature [° C.] | 130 | 130 | 130 | 130 | 130 |

Data from Tensile Shear Strength Tests

| Substrate | RHM 5 | RHM 6 | RHM 7 | RHM 8 | RHM 9 |
|---|---|---|---|---|---|
| Degreased steel | 7.7 TWC | 7.0 TWC | 4.7 TWC | 4.7 A | 3.4 A |
| Oiled steel | 2.7 A | 3.4 A | 4.3 TWC | 4.7 A | 3.2 A |
| Difference in shear strength: degreased steel → oiled steel | −65% | −51% | −9% | 0% | −6% |

Adhesion values (tensile strength in N/mm²-type of bond fracture)

It is clearly apparent that the adhesion properties of an RHM based exclusively on polyester decrease greatly in the case of oiled steel. This effect can be virtually fully suppressed by the addition of the inventive block copolymers (RHMs 7 and 8), and so no significant difference in the adhesion properties is noticeable between degreased and oily steel.

Production of Sulphur-Curing Sealants:

| | Sealant formulation | |
|---|---|---|
| Constituent | Formulation I (comparative example) | Formulation II (inventive) |
| Polyvest 110 | 12.0 | 12.0 |
| Polyvest HT | 7.0 | |
| P2 | | 7.0 |
| Buna CB 24 | 6.0 | 6.0 |
| Ionol LC | 1.0 | 1.0 |
| Irgafos 168 | 0.2 | 0.2 |
| Lamp black 101 | 0.5 | 0.5 |
| Sulphur | 2.5 | 2.5 |
| ZnO | 3.5 | 3.5 |
| Stearic acid | 0.4 | 0.4 |
| CaO | 3.0 | 3.0 |
| Alpha CT + P talc | 6.0 | 6.0 |
| Omyacarb 2 AL | 46.6 | 46.6 |
| Polyvest 110 | 3.3 | 3.3 |
| Polyvest HT | 5.0 | |
| P2 | | 5.0 |
| Vulkacit DM/C | 3.0 | 3.0 |

Analysis of Sulphur-Curing Sealants:

| | Formulation I (comparative example) | Formulation II (inventive) |
|---|---|---|
| Tensile shear strengths to DIN EN 1465 in N/mm² | | |
| Untreated steel | 0.61 | 0.80 |
| Galvanized steel | 0.77 | 0.78 |
| Aluminium | 0.68 | 0.87 |
| Visual assessment of fracture-cohesive fraction | | |
| Untreated steel | 0% | 100% |
| Galvanized steel | 80% | 100% |
| Aluminium | 0% | 80% |

The vulcanizable sealant formulation II according to the invention has a significant improvement in adhesion compared to formulation I. Tensile shear strength is significantly improved, especially on non-pretreated steel or aluminium. There is likewise a significant increase in the cohesive fraction of the fracture in the case of inventive formulation II, which, in conjunction with the higher tensile shear strengths, demonstrates an improvement in adhesion.

The invention claimed is:

1. An adhesive composition comprising block copolymers formed from OH-, or COOH-terminated polybutadiene and polyesters in adhesives or sealants, wherein the block copolymer is $B(A)_x$ block systems
   with A=polyester,
   with B=OH-, or COOH-terminated polybutadiene and
   with x≥1 wherein the adhesive composition contains at least one further polyol component, and
   wherein the functionality of the OH-terminated polybutadienes used is from 1 to 5.

2. The adhesive composition according to claim 1, wherein the OH— or COOH functionalized terminated polybutadienes are partially or completely hydrogenated, and
   wherein the functionality of the OH-terminated polybutadienes used is from 1.5 to 3.5.

3. The adhesive composition according to claim 2, wherein the block copolymers are based on polyesters made from a lactone.

4. The adhesive composition according to claim 2, wherein the block copolymers are based on polyesters made from a lactide.

5. The adhesive composition according to claim 1, wherein
   the block copolymer is $B(A)_x$ block systems are B'-(-Y-A'-X)$_x$ systems
   with A'=polyester radical, B'=OH—, or COOH-terminated polybutadiene,
   Y=O, or COO groups,
   X=OH or COOH terminal groups and x≥1, and
   wherein the functionality of the OH-terminated polybutadienes used is from 2 to 3.

6. The adhesive composition according to claim 1, wherein the block copolymers are based on polyesters made from a lactone.

7. The adhesive composition according to claim 1, wherein the block copolymers are based on polyesters made from a lactide.

8. The adhesive composition according to claim 1, wherein
the block copolymer is $B(A)_x$ block systems are $B'\text{-}(\text{-}Y\text{-}A'\text{-}X)_x$ systems
with $A'$=polyester radical,
$B'$=OH-, or COOH-terminated polybutadiene,
Y=O, or COO groups,
X=OH or COOH terminal groups and x>1 and
the block copolymers are based on polyesters made from a lactone and/or a lactide.

9. The adhesive composition according to claim 1, wherein the OH- or COOH-functionalized terminated polybutadienes are OH-functionalized terminated polybutadienes having a functionality of the OH-terminated polybutadienes from 1.5 to 3.5.

10. The adhesive composition according to claim 1, wherein the OH- or COON-functionalized terminated polybutadienes are OH-functionalized terminated polybutadienes having a functionality of the OH-terminated polybutadienes from 2 to 3.

11. An adhesive composition comprising block copolymers formed from OH-, or COOH-terminated polybutadiene and polyesters in adhesives or sealants, wherein the block copolymer is $B(A)_x$ block systems
with A=polyester,
with B=OH—, or COOH-terminated polybutadiene comprising the 1,3-butadiene-derived monomer units

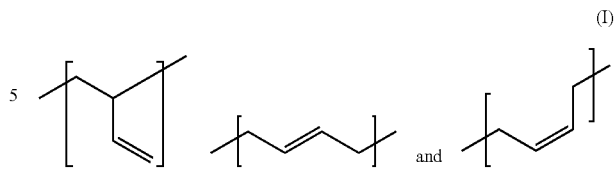

wherein the proportion of (I) in the entirety of the 1,3-butadiene-derived monomer units present in the polybutadiene is 10 to 60 mole percent, and wherein the sum total of the proportions of (II) and (III) in the entirety of the 1,3-butadiene-derived monomer units present in the polybutadiene is 40 to 90 mole percent, and
with x≥1 wherein the adhesive composition contains at least one further polyol component.

12. The adhesive composition according to claim 11, wherein the OH- or COOH-functionalized terminated polybutadienes are OH-functionalized terminated polybutadienes having a functionality of the OH-terminated polybutadienes from 1.5 to 3.5.

13. The adhesive composition according to claim 11, wherein the OH- or COOH-functionalized terminated polybutadienes are OH-functionalized terminated polybutadienes having a functionality of the OH-terminated polybutadienes from 2 to 3.

* * * * *

UNITED STATES PATENT AND TRADEMARK OFFICE
CERTIFICATE OF CORRECTION

PATENT NO. : 10,961,418 B2
APPLICATION NO. : 16/099817
DATED : March 30, 2021
INVENTOR(S) : Kolb et al.

Page 1 of 1

It is certified that error appears in the above-identified patent and that said Letters Patent is hereby corrected as shown below:

In the Claims

Column 14,
Line 39, "or COOH functionalized terminated" should read -- or COOH-terminated --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*